United States Patent [19]
Bernhardt

[11] Patent Number: 4,866,979
[45] Date of Patent: Sep. 19, 1989

[54] GOLF PUTTER BALANCE-REVEALING APPARATUS

[76] Inventor: Floyd V. Bernhardt, 5532 N. High School Rd., Indianapolis, Ind. 46254

[21] Appl. No.: 233,227

[22] Filed: Aug. 18, 1988

[51] Int. Cl.$^4$ ............................................. G01M 1/12
[52] U.S. Cl. ....................................................... 73/65
[58] Field of Search ........................ 73/65, 13; 434/252

[56] References Cited

U.S. PATENT DOCUMENTS 2,737,432  3/1956  Jenks ................................ 434/252 X

FOREIGN PATENT DOCUMENTS 448935  6/1948  Canada ................................. 434/252

*Primary Examiner*—Charles A. Ruehl
*Attorney, Agent, or Firm*—Woodard, Emhardt, Naughton, Moriarty & McNett

[57] ABSTRACT

A balance-revealing apparatus for testing the balance of golf putters according to the present invention includes a base which is adapted to rest on a generally horizontal surface and an upwardly extending support column rigidly affixed to the base. Disposed in the upper end of the support column is a flanged bearing block and received by the bearing block is a pivot arm. The pivot arm is adjustably attached to a tubular holder which in turn receives the golf putter. The tubular holder is designed such that the putter retained by the holder is able to rotate about the longitudinal axis of the putter shaft such that upon free pendulum swinging of the pivot arm, the squareness of the putter face upon impact with the golf ball can be determined and represents a measure of the true balance or imbalance of the putter.

17 Claims, 2 Drawing Sheets

GOLF PUTTER BALANCE-REVEALING APPARATUS

BACKGROUND OF THE INVENTION

The present invention relates in general to golf clubs, particularly putters, and to apparata used to evaluate or reveal the true balance of such putters.

The game of golf has been the recipient of numerous gadgets and ideas to try and give the amateur and weekend player an easier time in mastering the more difficult aspects of the game. Club faces have been modified with angles and grooves, weights have been selectively placed and exotic materials have been tried. The variety of golf balls and their surface-texturing is seemingly endless. Golf putters have been designed with unique contours, dots and lines for sighting and with various length shafts. While some of the gadgets and ideas have proven effective for amateurs, as well as some professionals, many have failed.

One aspect of the game of golf which is not in dispute is that the swing and stroke of the clubs should not be adversely influenced by conditions beyond the golfer's control. Much time is spent by a golfer in learning how to address the ball, the proper stance, how to draw the club back, shifting of the weight, the swing and follow through. There is a generally regarded proper way to do each of the foregoing yet if the golfer's equipment does not cooperate with the golfer's physical movement, the techniques will be harder to master and the game more erractic. For amateurs who generally do not play with the same frequency as professionals, there may not be enough time to master these various movements, especially if the golfer must first identify and then try to correct the adverse influences due to his equipment.

The putting stroke is not really any different than the swing of woods and irons. When putting, the body needs to remain still and the stroke smooth and aligned. A common fault in putting includes pushing the ball either left or right of the desired line to the hole. One critical aspect in the design of a golf putter is the balance of the putter and the ability to keep the face of the putter square to the ball when stroking. If the putter is weighted in such a way that it acts against the normal movement of the golfer's putting stroke or swing, such as by rotating about the longitudinal axis of the shaft, the chances of a mis-hit, pushing or pulling the ball are greater. If the putter has a tendency to turn or rotate in the hands of the golfer as the putter swings, due to poor balance, then the face will more readily turn out of squareness at the time of impact with the ball. The result is that the ball is pushed off from the desired line of travel. If this poor balance results in the putter curving in or out from a true follow through in the vertical plane of the line of sight, then the mis-hit is exacerbated.

While true balance for a putter is important, with the proliferation of putter styles it is virtually impossible for a golfer to know which putters have a true balance and which putters do not and thus will result in adversely affecting their game. Many putters today have excessive weight and a non-balanced nature, and thus the golfer has to both stroke the ball and at the same time try to adjust for the movement of the putter which is due simply to the pendulum swing and the imbalance characteristics.

The present invention provides an inexpensive and novel approach for testing the balance of golf putters. Any golfer interested in testing his or her current putter or whenever evaluating the purchase of a new putter, the present invention readily reveals the degree of imbalance and whether or not the non-balanced nature of the putter is of sufficient magnitude to adversely affect the putting stroke, especially through the critical zone of impact with the ball.

SUMMARY OF THE INVENTION

A balance-revealing apparatus for testing the balance of golf putters according to a typical embodiment of the present invention includes support means including a base and support column, a club arm pivotally received by the support column and holder means adapted to receive and retain a golf putter in a manner allowing putter rotation about the longitudinal axis of the putter shaft, said holder means being adjustably attached to the club arm for pivotal movement concurrently with the club arm.

One object of the present invention is to provide an improved balance-revealing apparatus for golf putters.

Related objects and advantages of the present invention will be apparent from the following description.

DESCRIPTION OF THE PREFERRED EMBODIMENT

Figure 1:
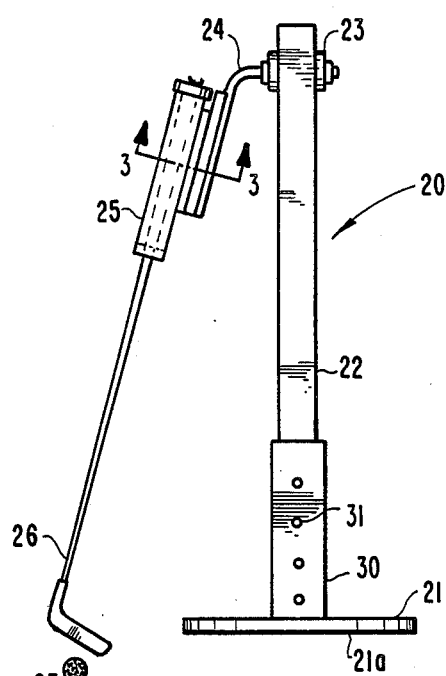
FIG. 1 is a front elevation view of a balance-revealing apparatus for golf putters according to a typical embodiment of the present invention and including an imbalanced putter.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a balance-revealing apparatus 20 which is designed for testing the balance of golf putters. Apparatus 20 includes a base 21 and a support column 22 which is rigidly attached to the base. In the FIG. 1 illustration, the base is constructed from a block of wood which may either be circular or rectangular in peripheral contour including a substantially flat lower surface 21a so as to be able to support the remainder of the apparatus on any suitable horizontal surface. Received by the upper end of the support column is a bearing block 23 which receives in a pivotal fashion pivot arm 24. Pivot arm 24 includes a first section which extends into and is received by the bearing block and a second section which extends outwardly and downwardly at an angle and is rigidly attached to tubular holder 25. Received within holder 25 is an improperly balanced putter 26. The entire apparatus is adapted to be placed on a horizontal surface and the putter, holder and pivot arm swung so as to simulate a putting stroke for the purposes of striking golf ball 27.

Figure 6:
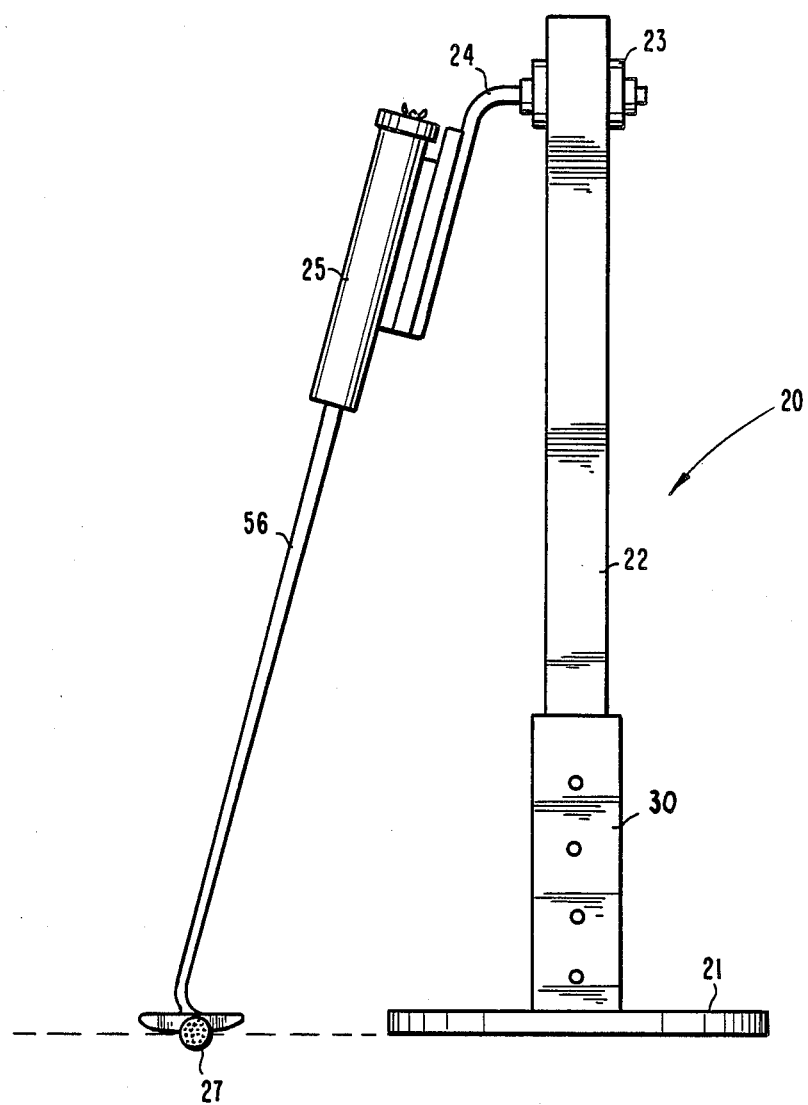
FIG. 6 is a front elevation view of the FIG. 1 apparatus with a balanced putter received.

Since putter 26 is not properly balanced, the pendulum swing of the putter by apparatus 20 has resulted in the putter rotating to the orientation illustrated. Due to incorrect weighting and balancing the putter head has twisted to a totally unacceptable orientation. While such twisting will not actually occur if the putter is securely held by the golfer, apparatus 20 reveals the forces at work which can noticeably affect the accuracy of the putt. In contrast, FIG. 6 shows a correctly balanced putter 56 received by apparatus 20. Putter 56 is illustrated as it will be oriented during the pendulum swing. Since the putter is balanced it does not twist or turn during the swing and is able to remain correctly oriented for a true and accurate stroke. Balance-revealing apparatus clearly reveals which putter is correctly balanced (putter 56) and which one (putter 26) is not.

As will be explained hereinafter, the attachment between pivot arm 24 and tubular holder 25 is done in a manner so as to make that attachment adjustable. As will be explained, it is possible to move the point and degree of attachment of the holder to the arm longitudinally along the length of the holder. However, this adjustable mounting does have certain dimentional limits and thus alternate height adjustment is provided by sleeve 30. Although if height adjustment is not desired, support column 22 may be rigidly attached directly to base 21. What is illustrated in FIG. 1 is a structure which incorporates a telescoping configuration wherein sleeve 30 is indirectly rigidly attached to base 21 but wherein support column 22 is movable within sleeve 30 and those members include cooperating apertures 31 which when aligned are suitable to receive a locking pin which may be inserted from the exterior of sleeve 30 in order to secure the support column at its desired height. What has been illustrated are four apertures 31 though virtually any number and spacing are envisioned as part of the teachings of the present invention.

In view of the fact that there are wide ranges and styles of golf putters, and with the desire to make the apparatus 20 somewhat universal, two points of adjustment are believed to be desirable. A further facet of the present invention is that it is generally designed to be free-standing on any generally horizontal surface. In this manner, the support for the apparatus comes from its own weight and stability is provided by the length or diameter size of base 21. It should be understood that the greater the extension of support column 22 and the wider the span of the pivot arm and putter, the resultant cantilevering effect will reduce the stability of the apparatus thereby suggesting adding greater weight to the base. In the event apparatus 20 is used outdoors where the generally horizontal surface may not be as flat or level as one would desire, the alternative illustrated in FIG. 4 may be employed.

Figure 4:
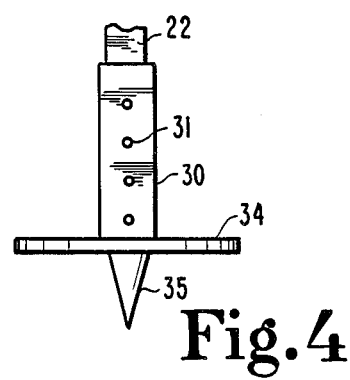
FIG. 4 is a partial front elevation view of an alternative base style which is suitable for incorporation as part of the FIG. 1 apparatus.

In FIG. 4, base 34 still receives sleeve 30 in a rigidly affixed fashion and the adjustability for support column 22 by way of aperture 31 is still provided. However, in lieu of relying solely on the substantially flat undersurface of base 34, as was described for surface 21a, base 34 includes a tapered stake 35 which is sufficiently pointed and of suitable length so as to be driven into the ground and thereby provide the requisite support and stability for the remainder of the apparatus. It is envisioned that if a golfer wishes to evaluate different putters as to their true balance or imbalance characteristics, apparatus 20 may be easily set up with foot pressure applied to the top surface of base 34 in order to facilitate driving stake 35 into the ground. Once securely placed in the ground, and aligned so that the support column is generally vertical, the putter balance procedure can be effected.

Figure 2:
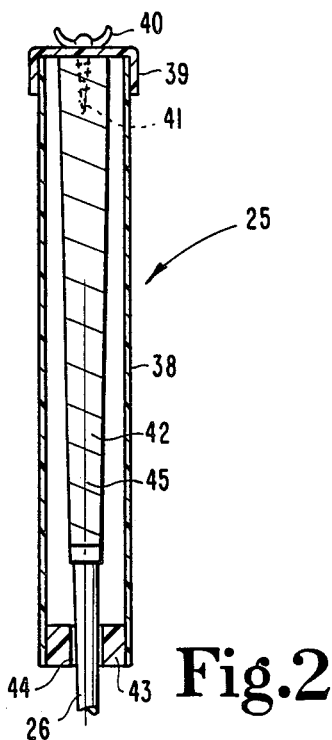
FIG. 2 is a partial front elevation view, in an upright orientation, of a holder assembled to the handle of the golf putter which comprises a portion of the FIG. 1 apparatus.

Referring to FIG. 2, the specific design of tubular holder 25 is illustrated. Tubular holder 25 includes a generally cylindrical main body portion 38 which in the preferred embodiment is a clear plastic tube of fairly lightweight construction. The upper end of main body portion 38 is provided with a cap 39 which has a top surface and surrounding side wall and whose inside diameter is larger than the outside diameter of the main body portion such that it fits freely on the main body portion and is free to rotate relative to the main body portion. Extending through cap 39 is a screw/wing nut fastener 40 whose threaded body 41 extends into the end of the putter handle 42. It should be understood that the only force tending to hold cap 39 onto main body portion 38 is gravity. The gravitational forces acting on the golf putter pull it downwardly such that the inside surface of cap 39 rests upon the top edge of main body portion 38. Consequently, if the putter is pushed upwardly, cap 39 becomes disengaged from main body portion 38.

Figure 5:
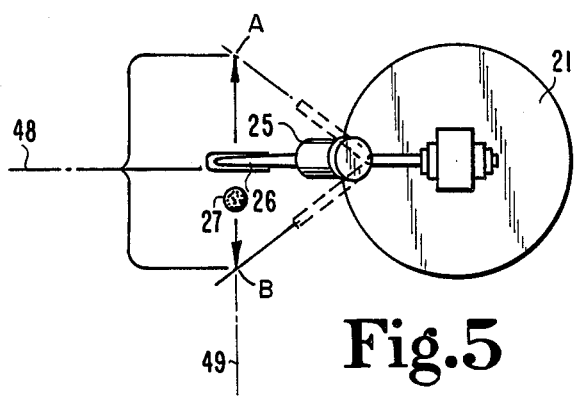
FIG. 5 is a diagrammatic top plan view illustration illustrating the pivotal swing of a golf putter received by the FIG. 1 apparatus.

The opposite lower end of main body portion 38 is fitted with plug 43 which fits snugly within main body portion 38 and is stationary therewith. Plug 43 is of a split-half design and includes a central clearance aperture 44 whose diameter size is larger than the diameter of that portion of the putter shaft which passes through plug 43. Consequently, while plug 43 is secured within main body portion 38 and while there is no relative motion between the two, the putter is free to rotate about its own longitudinal axis, which is denoted by broken line 45 such that as the pivot arm swings (see FIG. 5), the putter is free to rotate about its own longitudinal axis within holder 25. This ability to rotate freely about its own longitudinal axis is important in order to reveal the effect of any imbalance in the putter. If the putter is not truly balanced, the swinging motion which is illustrated in FIG. 5 will result in the head and face of the putter turning off axis so that upon impact with the ball, the face of the putter is not square to the ball. Conversely, a putter which is properly balanced, and in effect has a true balance, will pass through the critical area of impact consisting of several inches before and several inches after the point of impact with the ball, without turning or rotating off axis. While the degree or extent of imbalance is not quantitatively determined by the present invention, a comparison between various putters readily shows which ones have a true or near-true balance and which ones have an extreme or unacceptable imbalance.

Referring to FIG. 5, what is illustrated in diagrammatic form is a top plan view of apparatus 20 showing the orientation in broken-line form and with arrowheads of the path of the pivot arm, holder and putter as that assembly is drawn back to point "A" and released such that it freely swings to point "B." This distance from "A" to "B" is considered as the critical zone or area of impact and if the putter is not properly balanced, the substantially flat face of the putter head will diverge off of squareness with line 48 which denotes the optimal plane of impact for golf ball travel along desired line of sight 49.

Figure 3:
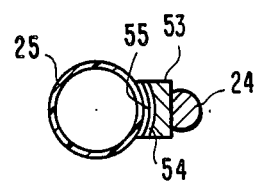
FIG. 3 is a top plan view as taken along line 3—3 in FIG. 1.

Referring to FIG. 3, the attachment of pivot arm 24 to holder 25 is illustrated. Although a variety of means may be possible, the preferred embodiment incorporates a strip of wood 53 which has a substantially flat surface on one side and a slightly curved or concave surface on the opposite side. Attached to the slightly curved surface is a first half of a "Velcro" assembly 54 while the other half of that "Velcro" assembly 55 is attached to holder 25. As is illustrated, pivot arm 24 has one side flattened so as to be readily and easily attachable to the substantially flat surface of wood strip 53 and is secured thereto by threaded fasteners. Separation between the two Velcro halves allows holder 25 to be moved along its length relative to pivot arm 24 so as to vary the position of the holder and in turn the position of the putter 26.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A balance-revealing apparatus for testing the balance of golf putters comprises:
    support means including a base and support column;
    a club arm pivotally received by said support column; and
    means for receiving and holding a golf putter so as to enable freedom of rotation for said golf putter about the longitudinal axis of the putter shaft, said means for receiving and holding being adjustably attached to said club arm for pivotal movement concurrently with said club arm.

2. The apparatus of claim 1 wherein the base of said support means is weighted for free-standing support of the remainder of said apparatus on a substantially horizontal surface.

3. The apparatus of claim 2 wherein the support column includes a bearing means adjacent an end distal from said base.

4. The apparatus of claim 3 wherein said club arm is a metal rod having a first section received by said bearing means and a second section adapted to be attached to said means for receiving and holding.

5. The apparatus of claim 1 wherein the support column includes a bearing means adjacent an end distal from said base.

6. The apparatus of claim 5 wherein said club arm is a metal rod having a first section received by said bearing means and a second section adapted to be attached to said means for receiving and holding.

7. The apparatus of claim 1 wherein said base includes a tapered stake and an enlarged flange positioned between the tapered stake and the support column.

8. A balance-revealing apparatus for testing the balance of golf putters comprises:
    support means including a base and support column wherein the base of said support means is weighted for free-standing support of the remainder of the apparatus on a substantially horizontal surface and wherein the support column includes a bearing means adjacent an end distal from said base;
    a club arm pivotally received by said support column;
    means for receiving and holding a golf putter so as to enable freedom of rotation for said golf putter about the longitudinal axis of the putter shaft, said means being adjustably attached to said club arm for pivotal movement concurrently with said club arm, said club arm being a metal rod having first section received by said bearing means and a second section adapted to be attached to said means for receiving and holding; and
    said means for receiving and holding includes a tubular member having an upper end and an opposite lower end, a cap which is threadedly attached to the putter grip and assembled to said upper end and a plug which is assembled to the opposite lower end.

9. A balance-revealing apparatus for testing the balance of golf putters comprises:
    support means including a base and support column;
    a club arm pivotally received by said support column;
    means for receiving and holding a golf putter so as to enable freedom of rotation for said golf putter about the longitudinal axis of the putter shaft, said holder means being adjustably attached to said club arm for pivotal movement concurrently with said club arm, wherein said means for receiving and holding includes a tubular member having an upper end and an opposite lower end, a cap which is threadedly attached to the putter grip and assembled to said upper end and a plug which is assembled to the opposite lower end.

10. The apparatus of claim 9 wherein said plug includes a central aperture which is of a diameter size that is greater than the portion of the putter shaft passing through the plug.

11. The apparatus of claim 10 wherein said cap is sized to fit over the upper end of said tubular member and arranged to rotate freely with the club relative to the tubular member.

12. The apparatus of claim 9 wherein the base of said support means is weighted for free-standing support of the remainder of said apparatus on a substantially horizontal surface.

13. The apparatus of claim 12 wherein the support column includes a bearing means adjacent an end distal from said base.

14. A balance-revealing apparatus for testing the balance of golf putters comprises:
    a support column designed and arranged to be oriented in an upright position on an substantially horizontal surface;
    a pivotally hinged support arm received by said support column; and
    a tubular holder rigidly secured to said support arm and designed to receive and support a putter in a manner that permits rotation of the putter about the longitudinal axis of the putter shaft.

15. A balance-revealing apparatus for testing the balance of golf putters comprises:
    a support column designed and arranged to be oriented in an upright position on an substantially horizontal surface;
    a pivotally hinged support arm received by said support column; and
    a tubular holder rigidly secured to said support arm and designed to receive and support a putter in a manner that permits rotation of the putter about the longitudinal axis of the putter shaft, wherein said tubular holder includes a main body member having an upper end and an opposite lower end, a cap which is threadedly attached to the putter grip and assembled to said upper end and a plug which is assembled to the opposite lower end.

16. The apparatus of claim 15 wherein said plug includes a central aperture which is of a diameter size that is greater than the portion of the putter shaft passing through the plug.

17. The apparatus of claim 16 wherein said cap is sized to fit over the upper end of said tubular member and arranged to rotate freely with the club relative to the tubular member.

* * * * *